July 5, 1949.　　　　E. W. CLARK　　　　2,475,375
METHOD OF PRODUCING EMBOSSED AND INTAGLIO EFFECTS IN
SMOOTH SURFACE ARTICLES FORMED OF MOLDED PLASTIC
Filed May 26, 1947
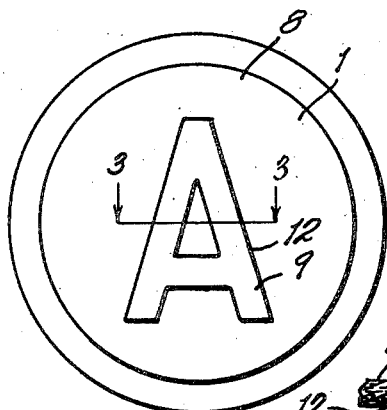
FIG.1
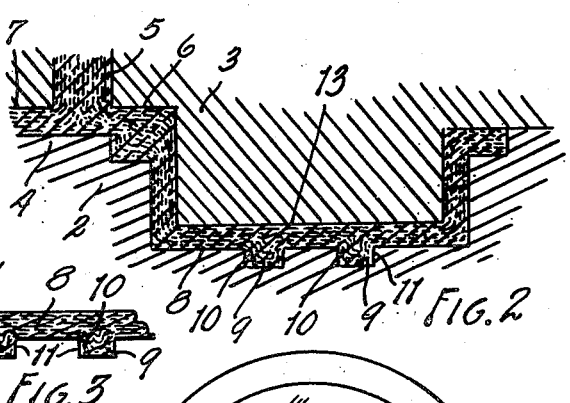
FIG.2
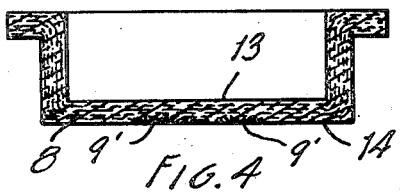
FIG.3
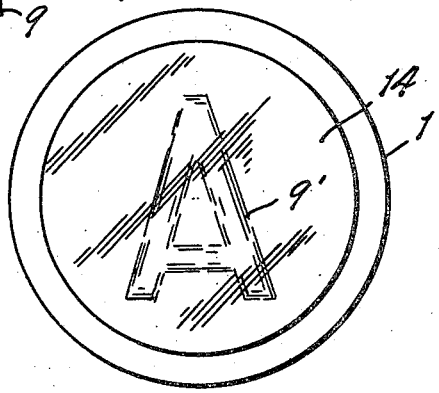
FIG.4
FIG.5
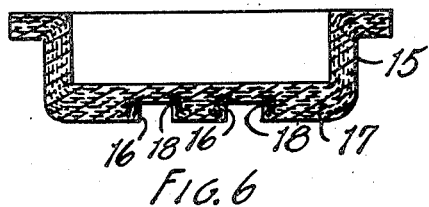
FIG.6
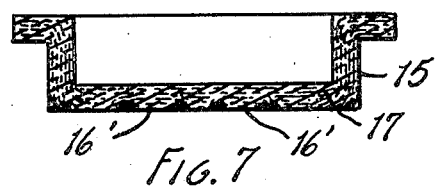
FIG.7
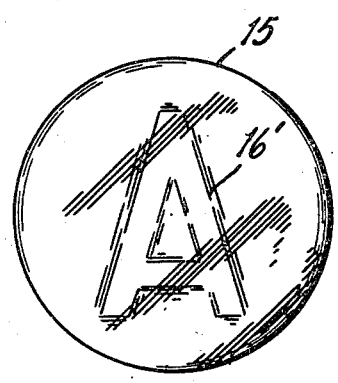
FIG.8
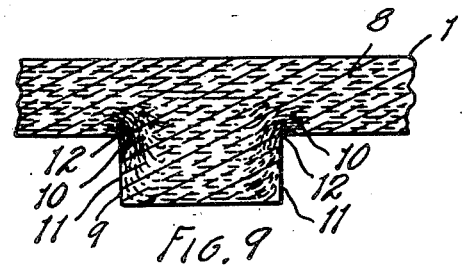
FIG.9
INVENTOR.
Earle W. Clark
BY
Attorney.

Patented July 5, 1949

2,475,375

UNITED STATES PATENT OFFICE 2,475,375

METHOD OF PRODUCING EMBOSSED AND INTAGLIO EFFECTS IN SMOOTH SURFACE ARTICLES FORMED OF MOLDED PLASTIC

Earle W. Clark, Grand Rapids, Mich., assignor to Keeler Brass Company, Grand Rapids, Mich.

Application May 26, 1947, Serial No. 750,558

4 Claims. (Cl. 18—61)

This invention relates to improvements in method of producing embossed and intaglio effects in smooth surface articles formed of molded plastic.

The main objects of this invention are:

First, to provide a method of obtaining embossed and intaglio effects in smooth surface articles formed of molded plastics, thereby producing a surface having the appearance of an embossed or intaglio surface adapted for many uses in which surfaces having relief or intaglio indicia or designs thereon are not adapted.

Second, to provide a method of producing articles of the class above described in which a plastic mass having a lustrous, nacreous, iridescent, and opalescent effect incorporated therein is molded, where under heat and pressure a definite of flow of the plastic mass into a mold can be established and controlled so as to produce raised or relief embossed indicia or designs on a surface thereof and thereafter treated or processed to remove such raised surface and leave an appearance of embossing on a smooth surface.

Third, to provide a method of producing articles from molded plastic which is economical of material and also of the processing steps, at the same time resulting in highly attractive finished articles.

Fourth, to provide a method of the class described in which optically simulated embossed or intaglio effects are secured on one surface of a plastic product without in any way affecting the opposed side or surface.

Fifth, to provide a method of producing articles of plastic material in certain so-called "pearl" plastics containing scale-like lustrous, nacreous, iridescent or opalescent materials such, for example, as "pearl Tenite," which are treated by simple molding steps to alter the plastic flow lines within the molded article at a certain predetermined area or areas, and thereafter buffed or finished at such areas in a manner to produce a highly pleasing simulated optical effect of embossing.

Objects relating to details and economies of the invention will appear from the description to follow. The invention is defined and pointed out in the claims.

Preferred embodiments of the invention are illustrated in the accompanying drawing, in which:

Fig. 1 is a plan view illustrating a plate or block molded from thermoplastic material of lustrous "pearlized" plastic such as the commercial product, known as "pearl Tenite" or similar thermoplastic material, as produced by the initial molding step of the invention.

Fig. 2 is a central vertical sectional view of a mold used in molding the article of Fig. 1, this view also illustrates the manner of injecting the plastic mass into the mold and the flow lines of the plastic mass in the mold.

Fig. 3 is a fragmentary view in section on the line 3—3 of Fig. 1.

Fig. 4 is a section on line 4—4 of Fig. 5 illustrating the final article or block following the removal of the initial embossed indicia or design of the product as produced by the initial molding operation.

Fig. 5 is a plan view also illustrating as in Fig. 4 the final article or block following the removal of the initial embossed indicia or design of the product.

Fig. 6 is a central vertical sectional view illustrating a modified form of plate or block as produced by the initial molding step of the invention, the indicia or design of the product being molded in intaglio instead of in relief as in Fig. 1.

Fig. 7 is a section on the line 7—7 of Fig. 8 illustrating the modified form of Fig. 6 following the removal of the outer face of the plate or block to a level coinciding with or slightly within the innermost portions of the intaglio.

Fig. 8 is a plan view illustrating as in Fig. 7 the modified form of Fig. 6 following the removal of the outer face of the plate or block to the level coinciding with or slightly within the innermost portions of the intaglio.

Fig. 9 is an enlarged fragmentary detail view in section illustrating the flow lines of the plastic material into and over a portion in relief of the molded article.

This invention relates to a method of producing optically simulated embossed and intaglio effects in plastic materials. It is highly desirable for certain purposes, for example, in the production of remote control handles, knobs or buttons, typewriter keys, clock dials, instruments, panels, and the like, and in the manufacture of dishes, trays and the like to provide a smooth surface for the "feel" and minimizing the collection of dust yet displaying indicia of various kinds or ornamental designs. It has been proposed to die emboss or indent letters, indicia, or designs upon the surface of the articles formed of plastic but this is not desirable in many cases because of the "feel" and the difficulty in keeping free from dust and dirt. It has also been proposed to indent the surface from the back and paint the desired indicia with the object of securing the exposed smooth surface but this is in the nature of a makeshift.

By the practice of the method of this invention, I am enabled to produce articles of any desired configuration normally obtainable in molding the thermoplastic materials in which an embossed effect is produced on a smooth surface simulating to the eye the effect of actual embossing on the surface, the indicia or designs being in an almost exact simulation of the normal embossing, the physical differences not being ordinarily observed until the work is examined by touch.

In the accompanying drawing illustrating the steps in my method, 1 designates generally an article of thermoplastic material, the commercial product known as "Tenite" or cellulose ester plastics, such as cellulose acetate and cellulose acetate butyrate or any similar thermoplastic material which can incorporate pearl essence, metal powder, mica or other agents to produce pearlescent effect, and which material is adaptable for injection molding, or molding where a definite direction of flow can be established and controlled, being examples of suitable thermoplastic materials. It should be understood that other forms than that shown may be produced, for example, knobs, buttons, discs, keys, dishes and ornamental objects may be produced by the method but I have used the article 1 shown for simplicity in illustration. The plastic material may be translucent, opalescent or opaque in character, the invention requiring that the same have incorporated therein a quantity of an agent capable of imparting a nacreous or pearlized appearance or some material which will produce substantially the effect of this type of material.

In the practice of the invention a mass of such material is molded in the steel mold designated generally by the numeral 2. This mold comprises the upper and lower complementary separable parts 3 and 4, respectively, the upper part being provided with the sprue or passageway 5 having the lead or branches 6 and 7, the branch 6 opening to the cavity of the mold 2 and the branch 7 opening to the cavity of another mold, not shown, similar to the mold 2. The plastic mass is forced under pressure by any suitable means, not shown, through the sprue 5 into the mold cavity. As the plastic mass leaves the branch or lead 6 which is of relatively small cross sectional dimension, it flows through the mold cavity spreading and fanning out and gradually filling the same. By reference particularly to Fig. 2 it will be noted that the direction of the flow of the plastic mass in the mold cavity is generally in a direction substantially parallel to the face 8 of the article containing portions 9 in relief. While the plastic mass is flowing in this general direction substantially parallel to the face 8 of the molded article, a portion of it flows into the indicia or defining cavities of the mold to form the embossed portions 9 of the molded article 1 as indicated in Figs. 2 and 9. This results in the alteration of the flow lines in the portions 9 in relief, said flow lines curving into the embossed portions as indicated by the numeral 10 in Figs. 2 and 9, thereby altering the orientation of the pearlizing material or agent at and behind said raised portions and within the plane of the face 8, as compared to the orientation of said particles in the areas of the article which are not covered by the embossing. The marginal or border surfaces 11 of the embossed portions 9 intersect the plane of the face 8 at an angle of 90°, and this angle has a relatively sharp vertex 12. This sharp vertex or edge 12 provides closely adjacent the same a sharp change in the direction of flow of the plastic mass around the edge and a sharp change in the direction of orientation of the lustre imparting particles in the plastic mass closely adjacent said edge. This sharp edge provides a very clear well defined highly pleasing simulated optical effect of embossing upon buffing the portions 9 in relief down to the level or slightly within the plane of the face 8 and closely adjacent said edge, as hereinafter described. The rear surface 13 of the article remains substantially unchanged in appearance which is a distant feature of the present invention rendering the resultant products adaptable for certain uses which would be precluded were the design or simulation thereof carried out on both surfaces of the finished article.

Following molding as described, the article is subjected to an abrading and/or buffing action on its front surface to entirely remove the embossing 9 and, permissibly, a slight amount of the material beneath said portion 9 on the body of the article. This buffing produces a highly polished, lustrous surface 14, as illustrated in Fig. 5, and a surface which is perfectly smooth or flat dependent upon the character of the article, yet in which the visual appearance of the embossings 9 of the originally molded article are practically exactly simulated optically, as indicated at 9' in Fig. 5. I attribute this to the fact that due to the relatively sharp edges 12 the lines of flow of the plastic, and consequently the orientation of the pearlizing particles therein, are sharply altered in direction closely adjacent the edges 12 of the areas formerly covered by the raised portions 9, and to providing a smooth surface across the face of the article closely adjacent the sharp edges 12. Also the concentration of said particles at said areas is variably intense across the area occupied by the raised portions and removed by buffing.

The final product produced in the manner described above is a highly attractive one indeed and many ornamental articles are susceptible of being thus produced. An important feature of the invention is the fact that the initial embossings are produced in the same molding operation as is employed in the shaping or conforming of the article itself, and this holds true whether said article is flat, rounded or curved, or otherwise specially shaped. Moreover, due to the fact that the invention in the embodiment of Figs. 1 to 5 inclusive is based on the production of indicia or design defining portions which are raised from the surface of the article, as distinguished from being indented therein, a minimum of material need be removed and wasted in the abrading or buffing operation necessary to produce the smooth flat surface. The fact that the initial embossings are produced by plastic molding is important and a definite advantage. Being perfectly smooth, the final product may be embodied advantageously in plastic plates, trays or the like as a hygienic measure.

In the embodiment of the invention illustrated in Figs. 6, 7 and 8 the indicia or design of the product is molded intaglio within the face of the molded article 15 as shown at 16 in Fig. 6. The outer face 17 of the molded article is then subject to an abrading and/or buffing action to remove the outer portion of the facing to provide a smooth surface coinciding with or slightly within the innermost relatively sharp edges 18 of the intaglio, the result being as at 16' in the section of Fig. 7 and the plan of Fig. 8. The steps of the process of the embodiment of Figs. 6, 7 and 8 are otherwise similar to those of the embodiment of Figs. 1 to 5.

As a further embodiment of my invention the embossed portion 9 in Fig. 1 and the intaglio 16 of Fig. 8 may be produced by taking a preformed plastic sheet containing lustre imparting particles having a pearlescent effect, and having the particles oriented generally in a common direction, replasticizing such sheet somewhat by heat and then subjecting it to the pressure of a metal die suitably shaped to mold the embossed portion 9 of Figs. 1 and 3 or the intaglio 16 of Fig. 6. This die is shaped to provide relatively sharp edges, as at 12 in Figs. 2 and 9. This provides a sharp change in the direction of orientation of the lustre imparting particles closely adjacent this edge as in the molding operation of the embodiments before described. The abrading or buffing operation to provide a smooth surface across the article closely adjacent this sharp edge where the change in direction of orientation of the lustre imparting particles is the sharpest is as heretofore described with respect to the other embodiments of the invention.

I have illustrated and described my invention in embodiments which I have found highly practical and such, I believe, as will enable those skilled in the art to embody or adapt my invention as may be desired.

Having thus described my invention, what I claim as new and desire to secure by Letters Patent, is:

1. The method of producing simulated embossed effects on the face of an article formed of plastic material, comprising the steps of flowing into a mold cavity a plastic material containing lustre imparting particles having a pearlescent effect, said mold cavity having a face disposed generally in a plane, said face having depressions therein, said depressions having an outline corresponding in shape to that of said simulated embossed effects on the article to be produced, said plastic mass being flowed in a stream across and generally parallel to the plane of the cavity face and also having portions thereof flowing into said cavity depressions in the cavity face, said cavity depressions in the cavity face having border surfaces intersecting the general plane of said cavity face at an angle of approximately 90°, said angle having a relatively sharp vertex to provide closely adjacent the vertex of said angle a relatively sharp change in the direction of flow of plastic mass into the cavity depressions of the cavity face to provide a relatively sharp change in the direction of orientation of the lustre producing particles in the plastic mass, and subsequently buffing and polishing the face of the article molded by said cavity face having depressions therein to provide a smooth surface which entirely removes the portions of the article molded in said depressions and which surface is disposed closely adjacent the sharp vertex of the angle of change in said direction of flow of the plastic mass and closely adjacent the sharp vertex of the angle of change in said direction of orientation of the lustre imparting particles in the plastic mass.

2. The method of producing simulated embossed effects on the face of an article formed of plastic material, comprising the steps of flowing into a mold cavity a plastic material containing lustre imparting particles having a pearlescent effect, said mold cavity having a face disposed generally in a plane, said face having depressions therein, said depressions having an outline corresponding in shape to that of said simulated embossed effects on the article to be produced, said plastic mass being flowed in a stream across and generally parallel to the plane of the cavity face and also having portions thereof flowing into said cavity depressions in the cavity face, said cavity depressions in the cavity face having border surfaces intersecting the general plane of said cavity face at an angle having a relatively sharp vertex to provide closely adjacent the vertex of said angle a relatively sharp change in the direction of flow of plastic mass into the cavity depressions of the cavity face to provide a relatively sharp change in the direction of orientation of the lustre producing particles in the plastic mass, and subsequently removing the portions of article molded in said depressions to provide a smooth surface which entirely removes the molded portions last named and which surface is disposed closely adjacent the sharp vertex of the angle of change in said direction of flow of the plastic mass and closely adjacent the sharp vertex of the angle of change in said direction of orientation of the lustre imparting particles in the plastic mass.

3. In a method adapted for the production of both simulated embossed effects and simulated intaglio effects on the face of an article formed of plastic material, the steps of molding a face of said article, the material molded being a plastic material containing lustre imparting particles having pearlescent effect and adapted to be oriented generally in a common direction, said molding including flowing the plastic material over a relatively sharp vertex formed by intersecting molding surfaces to provide intersecting surfaces in the plastic mass with the line of intersection constituting the outline of the simulated effect on the article to be produced, said last named surfaces intersecting at an angle having a relatively sharp vertex to produce adjacent the vertex of the angle a sharp change in the direction of orientation of said particles in the plastic mass and subsequently removing a portion of the article so molded to provide a smooth surface thereon disposed closely adjacent to the intersecting line and to the sharp vertex of said angle where the change in the direction of orientation of said particles is approximately the sharpest.

4. In a method adapted for the production of both simulated embossed effects and simulated intaglio effects on the face of an article formed of plastic material, the steps of molding an article of plastic material containing lustre imparting particles having a pearlescent effect, said molding including flowing the plastic material over a relatively sharp vertex formed by intersecting molding surfaces to provide intersecting surfaces in the plastic mass with the line of intersection in outline corresponding in shape to the outline of the simulated effect to be produced, said last named surfaces intersecting at an angle having a relatively sharp vertex to produce adjacent the vertex of the angle a sharp change in the direction of orientation of said particles in the plastic mass, and subsequently removing a portion of the article so molded to provide a smooth surface closely adjacent said line of intersection and to the sharp vertex of said angle where the change in direction of the orientation of the particles is approximately the sharpest.

EARLE W. CLARK.

REFERENCES CITED

The following references are of record in the file of this patent:

UNITED STATES PATENTS

| Number | Name | Date |
| --- | --- | --- |
| 1,806,863 | Paisseau | May 26, 1931 |
| 1,886,972 | Payne | Nov. 8, 1932 |